United States Patent [19]

Tucciarone

[11] 3,901,544
[45] Aug. 26, 1975

[54] PET SCOOP, SANITATION DEVICE

[76] Inventor: Lucien Tucciarone, 640 Center St., Ridgefield, N.J. 07657

[22] Filed: Dec. 19, 1973

[21] Appl. No.: 426,001

[52] U.S. Cl................ 294/19 R; 15/257.6; 294/1 R
[51] Int. Cl.²... A01B 1/02; A01K 1/01; A47L 13/52
[58] Field of Search.......... 15/104.8, 257.6; 56/333; 294/1 R, 19 R, 19 A, 55

[56] References Cited
UNITED STATES PATENTS

| 431,709 | 7/1890 | Ridlon | 56/333 |
| 2,315,831 | 4/1963 | Wilcox | 294/55 |
| 3,799,598 | 3/1974 | Lavaggi | 294/19 R |
| 3,802,728 | 4/1974 | Giacopelli | 294/19 R |
| 3,804,448 | 4/1974 | Schmieler | 294/19 R |

FOREIGN PATENTS OR APPLICATIONS 12,456   5/1906   United Kingdom................ 294/1 R Primary Examiner—Daniel Blum

[57] ABSTRACT

A member defining an upright hollow hemisphere with a side wall opening is open at the bottom and has a spaced end portion. A flat horizontal disc disposed under the member and cooperating with the end portion can be pivoted into and out of sealing engagement with the bottom of the member. The disc has a raised peripheral portion which closes the side opening when the bottom is sealed. Suitable means, also defining a handle, manually operates the disc. The disc and member define a scoop for removing animal excrement from a walk or the like.

3 Claims, 7 Drawing Figures

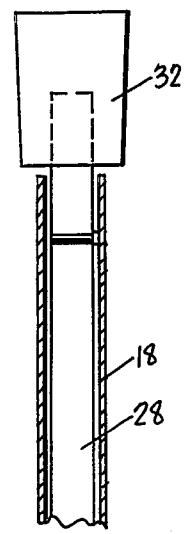
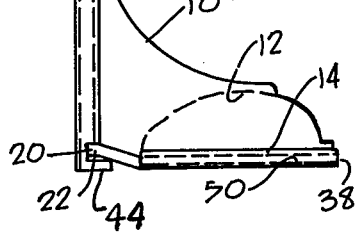
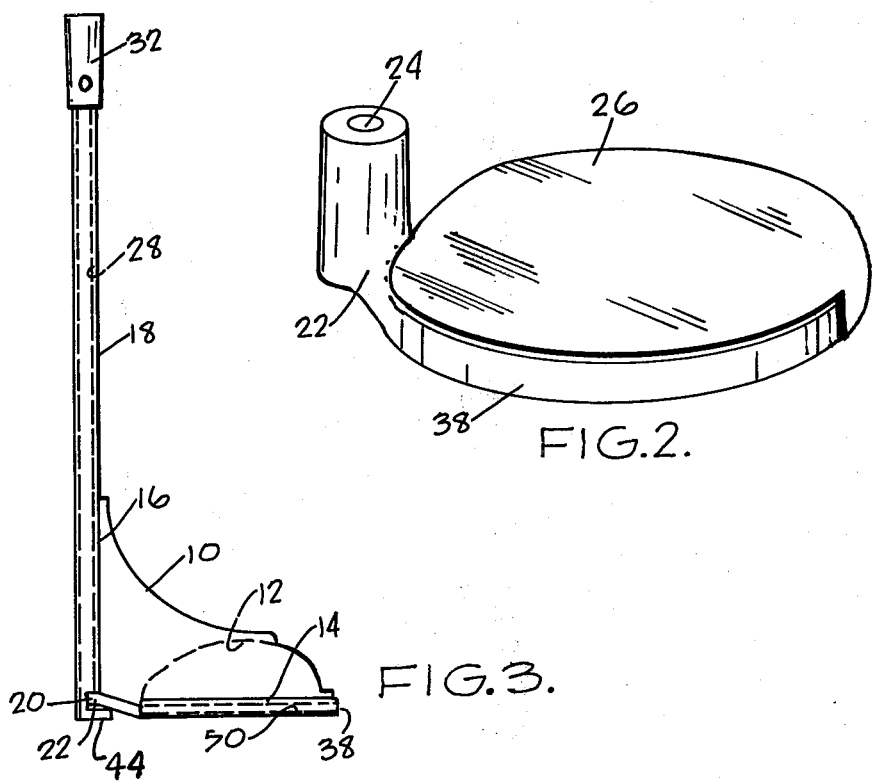

PET SCOOP, SANITATION DEVICE

SUMMARY OF THE INVENTION

This invention is directed toward a simple manually operated device which can be used easily without bending by the operator to remove animal excrement from walks, lawns and other surfaces for subsequent disposal in a convenient sanitary manner.

To this end, a member defining a hollow upright hemisphere with a side wall opening is open at the bottom and has a spaced end portion. A flat horizontal disc disposed underneath the member and cooperating with the end portion can be pivoted into and out of sealing engagement with the open bottom. The disc has a raised peripheral portion which closes the side opening when the disc seals the member, the opening being otherwise exposed. Suitable manually controlled means also forming a handle enable the disc to be pivoted. The device in some respects resembles a golf club in appearance.

In use, the member is disposed over the material to be removed with the disc swung outward to one side. The disc is then pivoted to swing underneath the material and pick it up, the device then closing the bottom of the member. The member and disc then jointly enclose the material and hold it.

The material can be subsequently flushed out or otherwise disposed of.

BRIEF DESCRIPTION OF THE DRAWINGS

In the drawings:

FIG. 1 is a detail view of a portion of the structure of FIG. 3;

FIG. 2 is a detail view of another portion of the structure of FIG. 3;

FIG. 3 shows one the structure of the invention and in closed position;

DETAILED DESCRIPTION OF PREFERRED EMBODIMENTS

Figure 4:
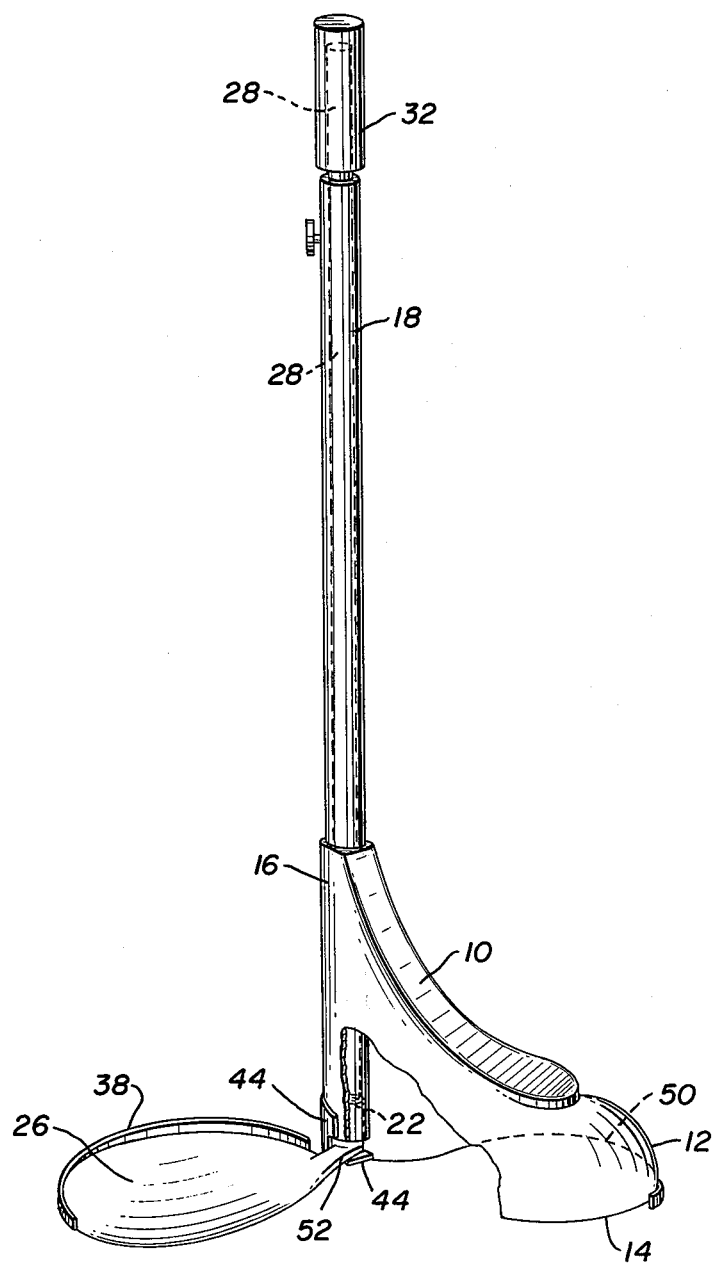
FIG. 4 shows the structure of FIG. 3 is open position.

Referring first to FIGS. 1-4, a member 10 has a vertical hollow upright hemispherically shaped chamber 12 having a flat horizontal bottom 50 and with a side opening 14. The member has a vertical end section 16 secured to a vertical hollow tube 18. Tube 18 extends along section 16 to a point just above extension 52 of flat horizontal disc 26. The disc is disposed below the bottom opening of chamber 12. The disc has a back stop 38 adapted to seal opening 14. A heel plate 44 is secured to the bottom of tube 18. A vertical shaft 28 fits into and is rotatable within tube 18. The bottom end of this shaft is attached to a vertical cylinder 22 secured to extension 52 whereby rotation of shaft 28 causes disc 26 to swivel. The upper end of shaft 28 passes out of tube 18 and is secured to handle 32.

As handle 32 is rotated, disc 26 is pivoted into and out of sealing engagement with the bottom of chamber 12 and back stop 38 is moved into and out of sealing engagement with opening 14. The invention can then be used as desired.

While I have described my invention with particular reference to the drawings, such is not to be considered as limiting its actual scope.

Having thus described the invention, what is asserted as new is:

1. Apparatus for removing animal excrement from a surface comprising:
    a vertical hollow tube open at both ends;
    a heel plate secured to the bottom of the tube and forming a side opening with the bottom of the tube;
    a hollow member defining an upright hollow hemisphere with a side wall opening communicating with the interior, said member being open at the bottom and having an end portion spaced from the hemisphere, said end portion being secured to said tube whereby the interior of the hemisphere communicates with the side opening of the plate;
    a horizontal disc having an extension extending into the side opening of the plate, said disc being horizontally pivotable between a first position at which the bottom of the member is sealed and a second position at which said bottom is exposed, the disc having a raised peripheral section which closes the member side opening when the disc is in the first position, the member side opening being exposed when the disc is in the second position; and
    manually rotatable means disposed in the tube and secured to the disc extension to pivot said disc.

2. Apparatus of claim 1 wherein said means includes a vertical shaft rotatable in the tube.

3. Apparatus of claim 2 wherein the top end of the shaft extends above the top of the tube and is secured to a vertical rotatable handle.

* * * * *